Figure 1:
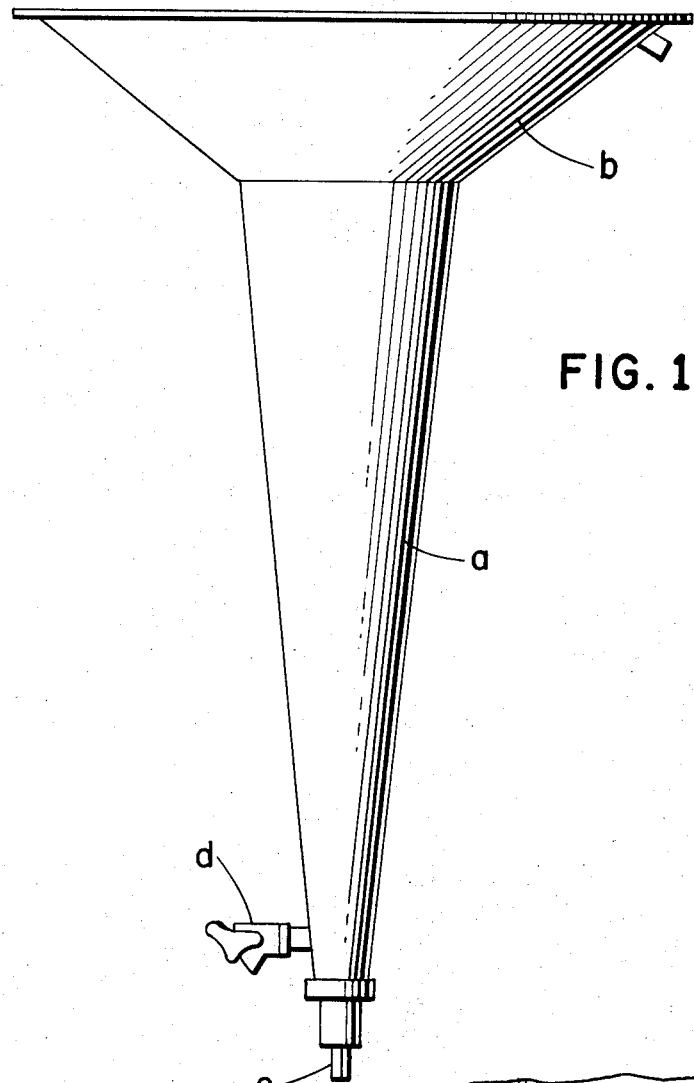

United States Patent [19]
Martini et al.

[11] 3,806,103

[45] Apr. 23, 1974

[54] APPARATUS FOR CONTINUOUS CEMENTATION OF METALS FROM SOLUTIONS BY MEANS OF METAL GRANULES

[75] Inventors: Pierluigi Martini, Gassino Torinese; Giovanni Scacciati; Amos Vaschetti, both of Torino, all of Italy

[73] Assignee: Montedison S. p. A., Milan, Italy

[22] Filed: Feb. 22, 1973

[21] Appl. No.: 334,738

[30] Foreign Application Priority Data
Feb. 23, 1972 Italy.................................. 20913/72

[52] U.S. Cl...................................... 266/22, 75/109
[51] Int. Cl............................................... C22b 3/02
[58] Field of Search ................. 75/108, 109; 266/22

[56] References Cited
UNITED STATES PATENTS
3,606,290   9/1971   Ransom ............................... 266/22

Primary Examiner—Gerald A. Dost

[57] ABSTRACT

An apparatus for the continuous cementation of metals from solutions, using metal granules, and for the removal of the cemented element covering the granules, in order to renew and to activate the surface of said granules. The apparatus consists of:

a. — a conical reactor in which is formed a fluid bed of granular cement particles of the cemented metal, and of cementing metal particles which have reacted only partially, kept in suspension by the flow of the solution containing the metal to be cemented;

b. — a mechanical "activator" arranged inside the reactor, and whose function it is to exert a powerful impact and friction action on the cement particles in suspension. Said "activator" consists of a rotor fitted with small blades having a slant with respect to the rotary axis and fastly revolving inside an open cylinder with a slightly greater diameter and preferably co-axial with thr axis of the cone.

4 Claims, 2 Drawing Figures

PATENTED APR 23 1974 3,806,103

APPARATUS FOR CONTINUOUS CEMENTATION OF METALS FROM SOLUTIONS BY MEANS OF METAL GRANULES

The present invention relates to an apparatus suitable for the continuous cementation of metals from solutions by means of metal granules.

The apparatus finds its application, for instance, particularly in some processes for the cementation and recovery of cadmium in the depuration of zinc-containing solutions intended for zinc electrolysis, as well as in the cementation processes and in the recovery of copper from copper containing solutions.

In the industrial plants for the extraction of zinc by the hydrometallurgical method, the depuration from the cadmium is in general carried out continuously in vats fitted with a stirrer, and in which zinc is being added in the form of a very fine powder.

This method, however, has several drawbacks such as:
- a high consumption of zinc powder; in fact, this powder is added in quantities equal to 2–3 times the stoichiometric quantity;
- formation of a spongy cement which decants with difficulty and for the recovery of which it is necessary a total filtering of the solution;
- the possibility of re-dissolving the cement during filtering and the loss of electrolite retained by soaking in the cement sponge;
- the obtention of a cement with a low titre of cadmium (in general 40 percent of Zn and 20 percent of Cd).

In order to eliminate or limit at least partly said drawbacks, methods have been suggested which have not found any practical application.

For instance, a pulsing apparatus is known in which the cadmium cements on zinc granules, kept in motion by the mechanical pulsing that is transmitted to the solution, and successively the cadmium comes off due to the effect of the collision of the zinc particles with each other and is then draffed off by the current of the solution. However, such an apparatus actually is not suited for operation on an industrial scale since in order to strip off the cadmium from the zinc particles, a great shearing stress is requested and in order to obtain said shearing stress, it is necessary to set the whole solution mass into a pulsing motion.

There is also known another method according to which the cadmium is cemented in a mill that is internally lined with a zinc sheet and filled for 70 percent with zinc plated steel balls, with or without the addition of zinc powder. The reactivity of the zinc in this way turns out to be increased. However, also this apparatus proves to be too complicated for application on an industrial scale, because, as in the previously cited case, in order to achieve an effective action on the cement particles, it is necessary to keep the whole mass of the solution in motion.

As far as the copper is concerned, different fields of application of the cementing process of this element are known, for each of which a special technology has been adopted. Thus, for instance, for the recovery of the copper from mining waters, iron scrap containing canals are used along which a cuprous solution is made to circulate. Besides these most conventional apparatuses there exist precipitation cells fitted with grills on their bottom and are divided in two by a baffle that reaches down to the grill, as well as conically shaped apparatuses loaded with iron scrap or with iron granules.

However, all these apparatuses have the drawbacks that the cemented cadmium tends to adhere to the cementing material and/or to the inside walls and that the growing of the copper deposits may, after a certain time, cause a drop in the output of the reactor if not its complete clogging. In order to avoid or at least reduce such a phenomenon, it is necessary to use solutions with a low copper concentration, possibly by re-cycling part of the exhausted solution so that the concentration in the cementation apparatuses be not greater than about 10 $g/lt$.

The recovery of the copper from solution coming from the chlorinating treatment of copper pyrites, in general takes place in drum reactors loaded with iron scrap, suited for treating concentrated solutions (10–40 $g/lt$ of Cu).

These reactors require, however, a considerable capital investment, they have a high operational cost and, given their discountinuous operation, the down times for loading and discharging reduce their output capacity.

Thus, one object of this invention is that of providing an apparatus suitable for the cementation of solutions with metal granules, and which will avoid the above mentioned drawbacks.

Still another object of this invention is that of providing an apparatus that be simple in operation and of easy application.

All these and other objects still have been obtained by using the apparatus object of this invention, and which consists of:

a. — a conical reactor in which a fluid bed of granular particles of cement of the cemented metal and of particles of cementing metal, only partially reacted, is formed and where the granular particles are maintained in suspension by the flow of the solution containing the metal to be cemented;

b. — a mechanical "activator" arranged inside the reactor and serving to exert a powerful impacting action and a friction effect on the cement particles in suspension, and which consists of a rotor fitted with blades having a slant with respect to its rotational axis and which fastly revolve inside an open cylinder with a slightly greater diameter, and preferably co-axial with the axis of the cone.

By means of this "activator" it is possible to remove the cemented element from the granules, renew and re-activate the surface of said granules.

In the particular case in which the cemented metal is malleable (as for instance: cadmium, lead, indium, tallium), the "activator" has also the function of pelletizing it, thereby forming a product of a high apparent density, separable from the liquid by simple decanting, and which is resistant to atmospheric oxidation.

For a better understanding of the working of the apparatus, reference is made to the drawings 1 and 2.

In the conical reactor $a$ of FIG. 1 there takes place the exchange between the metal in solution which is fed in from below through a hydrostatically tight check valve $c$, and the cementing metal contained in the granules. In the top hopper $b$ there occurs a drop in the upward speed of the fluid, which allows the decanting of the cement possibly dragged out of the conical reactor.

Figure 2:
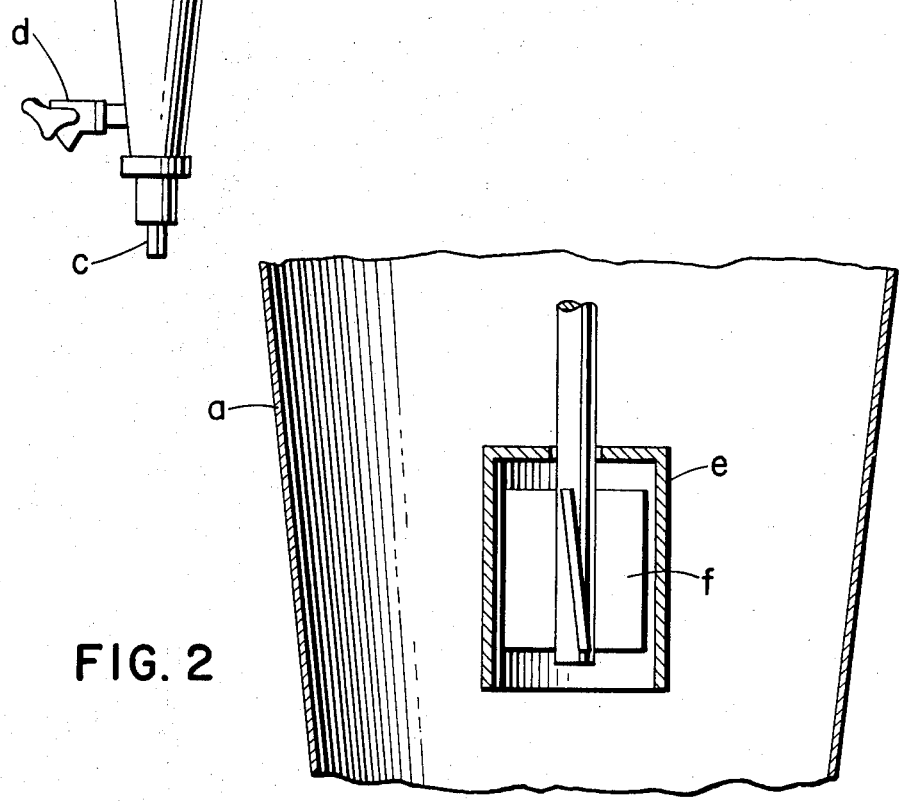

In FIG. 2 is shown that part of the apparatus which has the function of activating the cement. The cylinder $e$, made of a material resistant to the circulating liquids, in general of stainless steel, must be of reduced size with respect to the dimensions of the reactor, so as not to disturb the fluidization of the cement in the reactor. The small blades $f$ in general are inclined with an angle with respect to the rotor's axis comprised between 2° and 20°, and they are kept in fast rotation so that their peripheral speed be comprised between 100 and 1,000 mt/min.

The distance between the blades and the cylinder walls is kept at a minimum, in the order of about 1–5 mm, and during the rotation that particular energetic impact and friction action of the cement particles is generated, which provokes the removal from the granules of the dendrites of the cemented metal and, as in the case of malleable metals, leads to their pelletizing, just as previously mentioned.

Through all this one obtains particles with a high titre in cemented metal which precipitate preferably onto the bottom of the reactor and may be removed from there by continuous intermittent drawings through check valve $d$ of FIG. 1.

The reactivity of the remaining cementing metal is rather high and its consumption is actually reduced to quantities hardly greater than the stoichiometric quantity.

In order to still better illustrate the inventive idea of this invention, the following examples are given.

EXAMPLE 1

A neutral zinc sulphate solution, obtained by sulphuric lixiviation of a technical zinc oxide by the running methods of the Prior Art, and which contains 140 $g/1t$ of $Zn$, 0.55 $g/1t$ of $Cd$, 0.090 $g/1t$ of $Cu$, was made to flow into the apparatus shown in FIG. 1, whose conical part has a volume of 73 cu.dm and an angle of 12°, while the upper hopper has a volume of 154 cu.dm. The flow rate of this reactor was 1,600 $1t/h$ while the temperature amounted to 50° C.

Under operational conditions, the reactor contained in the conical part about 100 kg of granular material consisting for the greatest part of cemented $Cd$ and of only partially reacted $Zn$ particles. The material was fluidized by the solution flowing in from below, and part of it, which is continuously renewed, comes into contact with the activator blades, of FIG. 2 (the blades being 4 in number) and is projected against the inside wall of the cylinder which is at about a third of the height of the apex of the cone and having a diameter that is about a third of the diameter of the cone at that level.

By means of an automatic feeder, placed at the height of the activator cylinder 750 $g/h$ of zinc granules were added to the material. Through valve $d$ of FIG. 1 was intermittently drawn a cement containing: 60 percent $Cd$, 9 percent $Cu$, 15 percent of $Zn$. After cementation the $Cd$ in solution was reduced to 0.0015 $g/1t$ and the $Cu$ to 0.0002 $g/1t$.

This solution contained also, as a suspended solid, a small part of the metal cement; about 2 percent of the cemented cadmium flows out with the solution. Without resorting to filtering, the solution was fed into a reactor similar to the preceding one for a second treatment, while, when using conventional methods, it becomes necessary to carry out a filtering between the first and the second treatment.

In the second reactor the granular material in suspension contained more than 90 percent of zinc, thus no heavy cement rich in cadmium was obtained and the apparatus illustrated in FIG. 2 acted only for the activation of the zinc.

The solution coming out of the second apparatus contained 140 $g/1t$ of $Zn$, 0.0002 $g/1t$ of $Cd$ and 0.0001 $g/1t$ of $Cu$.

The solid material, containing more than 90 percent of $Zn$ was drawn from the bottom of the reactor intermittently and was pumped into the head of the first reactor to replace part of the zinc powder used for the cementation, thereby achieving a further saving in this reactant with respect to conventional methods.

EXAMPLE 2

A neutral copper chloride solution, obtained for instance through precipitation with water of the volatile chlorides coming from a plant of chlorination of impure pyrite ashes, and containing 26.5 $g/1t$ of $Cu$, 63.8 $g/1t$ of $Zn$, 33.9 $g/1t$ of $Ca$, 0.42 $g/1t$ of total $Fe$, 163.8 $g/1t$ of $Cl^-$ and 0.48 $g/1t$ of $SO_4$; was fed into an apparatus of the same characteristics of that used in example 1. The flow rate amounted to 2,000 $1t/h$ while the temperature was 60° C.

Under operational conditions the reactor contained in the conical part about 100 kg of granular material, mainly consisting of cemented copper and of particles of cementing material, that have reacted only partially and which consist of cast iron with a content in Fe of 90 percent.

The material was fluidized by the solution flowing in from below, and part of this material, which is continuously renewed, came in contact with the blades of the mechanical activator illustrated in FIG. 2 and was projected against the inside wall of the cylinder.

By means of the automatic feeder there were added 54 $kg/h$ of granules of the cementing material which consisted for 90 percent of metal $Fe$.

The granules of the cementing material were introduced into the lower zone of the reaction cone $a$ of FIG. 1. Thanks to the action of the mechanical activator of FIG. 2, the cemented copper was stripped from the surface of the granules. The copper cement, as a soft and fine powder, thus obtained was progressively dragged away by the solution, first out of the reaction zone $a$ of FIG. 1 into the decanting zone $b$, and then from this latter out of the apparatus.

The solution that comes out of the reactor contained 0.05 $g/1t$ of $Cu$; thus, the recovery of this element amounted to 99.8 percent. The copper cement dragged out by the solution that flows out of the apparatus, was recovered by means of the known decanting and/or filtering methods.

The recovered cement was then washed with water in order to remove most of the soluble chlorides and then was briquetted Thereby were obtained bricks that could easily be dried and which showed a considerable mechanical resistance to impacts. The briquettes contained, on the dry, 80.3 percent of $Cu$ and 0.5 percent of $Cl$.

We claim:

1. An apparatus for the continuous cementation of metals from solutions, using metal granules, and for the removal of the cemented element covering the granules, in order to renew and to activate the surface of said granules, consisting of:
  a. — a conical reactor in which is formed a fluid bed of granular cement particles of the cemented metal, and of cementing metal particles which have reacted only partially, kept in suspension by the flow of the solution containing the metal to be cemented;
  b. — a mechanical "activator" arranged inside the reactor, and whose function it is to exert a powerful impact and friction action on the cement particles in suspension, said "activator" consisting of a rotor fitted with small blades having a slant with respect to the rotary axis and fastly revolving inside an open cylinder with a slightly greater diameter and preferably co-axial with the axis of the cone.

2. An apparatus according to claim 1, wherein the small blades revolve in such a way that their peripheral speed is comprised between 100 and 1,000 mt/min.

3. An apparatus according to claim 1 wherein the inclination angle of the blades with respect to the axis of the rotor is composed between 2° and 20°.

4. An apparatus according to claim 1, wherein the blades are located inside the cylinder at a distance comprised between 1 and 5 mm.

* * * * *